(12) United States Patent
Dinham-Peren et al.

(10) Patent No.: US 9,003,989 B2
(45) Date of Patent: Apr. 14, 2015

(54) FULL FORM SHIP'S HULL WITH REDUCED WAVE MAKING RESISTANCE

(75) Inventors: Thomas Dinham-Peren, Hampshire (GB); Hans-Richard Hansen, Bergen (NO)

(73) Assignee: BMT Defence Services Limited Teekay Shipping Norway AS, Bath (GB)

( * ) Notice: Subject to any disclaimer, the term of this patent is extended or adjusted under 35 U.S.C. 154(b) by 172 days.

(21) Appl. No.: 13/816,022

(22) PCT Filed: Aug. 9, 2011

(86) PCT No.: PCT/GB2011/001196
§ 371 (c)(1),
(2), (4) Date: Apr. 11, 2013

(87) PCT Pub. No.: WO2012/020223
PCT Pub. Date: Feb. 16, 2012

(65) Prior Publication Data
US 2013/0192505 A1    Aug. 1, 2013

(30) Foreign Application Priority Data

Aug. 9, 2010    (GB) .................................. 1013295.9

(51) Int. Cl.
*B63B 1/00*    (2006.01)
*B63B 1/06*    (2006.01)

(52) U.S. Cl.
CPC . *B63B 1/06* (2013.01); *Y02T 70/126* (2013.01)

(58) Field of Classification Search
USPC ............................................. 114/56.1, 61.27
IPC .......................................................... B63B 1/10
See application file for complete search history.

(56) References Cited

U.S. PATENT DOCUMENTS 4,715,305 A * 12/1987 Wilkman et al. ............... 114/40
5,161,477 A    11/1992 Lindqvist

FOREIGN PATENT DOCUMENTS

| BE | 538852 | 6/1995 |
|---|---|---|
| CA | 2222500 | 11/1996 |
| DE | 580 817 C | 7/1933 |
| EP | 1 852 344 A1 | 11/2007 |
| FR | 2 574 042 A1 | 6/1986 |
| GB | 449 417 A | 6/1936 |
| GB | 2009677 | 6/1979 |
| SU | 941235 | 7/1972 |

OTHER PUBLICATIONS

International Search Report and Written Opinion for Appl. No. PCT/GB2011/001196 dated Nov. 29, 2011.
Search Report for GB1013295.9 dated Nov. 17, 2010.

* cited by examiner

*Primary Examiner* — Stephen Avila
(74) *Attorney, Agent, or Firm* — Fay Sharpe LLP (57) ABSTRACT

The efficiency of a full form hull is improved by moving the position of the forward shoulder (3) forwards and upwards to obtain at least a partial antiphase interaction between the shoulder wave and bow wave, sufficient to prevent the bow wave from breaking at its second crest, and introducing a forwardly tapered portion (7) between the forward shoulder and the mid-body (1).

20 Claims, 6 Drawing Sheets

FIG. 7  BOW

FULL FORM SHIP'S HULL WITH REDUCED WAVE MAKING RESISTANCE

This application is a National Stage entry of PCT International Application Number PCT/GB2011/001196, filed on Aug. 9, 2011, and claims priority to and the benefit of GB 1013295.9 filed Aug. 9, 2010, the disclosures of which are incorporated herein by reference in their entireties.

This invention relates to full form hulls for ships. In this specification, a full form hull is a displacement hull for a full form vessel having a block coefficient of at least 0.75 and a Froude number of not more than 0.25 at the ship's service speed.

Full form vessels are typically cargo ships, having steering and propulsion means, and include for example oil tankers; bulk carriers; shuttle tankers; and also some large vessels conventionally having parallel middle bodies but typically somewhat finer lines than those above mentioned, such as container ships.

The efficiency of the hull, corresponding to the energy required to propel the hull through the water relative to the size and service speed of the vessel, is determined inter alia by drag resistance, resulting from friction between the hull and the water; and wave resistance, representing the energy dissipated as surface waves which are generated by the motion of the hull through the water.

The motion of the vessel through the water gives rise to a pressure field over the whole submerged portion of the hull. Surface waves are generated by the motion of water displaced by this pressure field in a pattern which reflects the contours of the hull, with the generation of wave systems being focused particularly at abrupt transitions and more bluntly angled portions of the hull geometry with respect to its direction of motion. A proportion of the energy required to propel the vessel is dissipated in creating these wave systems, each of which may for simplicity be conveniently considered as a pure wave designated by a corresponding hull feature. Thus, the bow will give rise to a "bow wave", and the forward shoulder to a "shoulder wave".

The hull form of such vessels is designed to optimise efficiency while at the same time maximising the cargo carrying capacity of the vessel, within the practical dimensional constraints imposed by key shipping routes and docking facilities.

Figure 1:
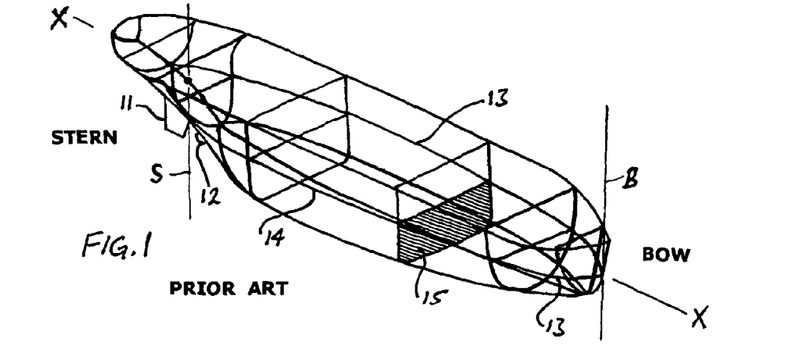
FIG. 1 shows a prior art full form hull.
Figure 2:
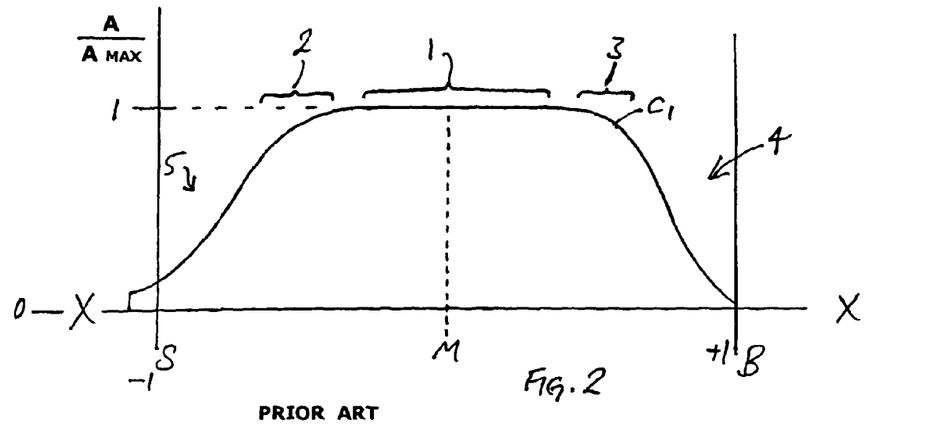
FIG. 2 is a non-dimensionalised section area curve for the hull of FIG. 1.

A conventional full form hull is shown in FIG. 1 with FIG. 2 showing the corresponding section area curve (representing the transverse cross-sectional area of the submerged portion of the hull at each point on its length). The prior art hull comprises a forward body portion and an after body portion joined by a parallel middle body portion. The regions where the section area curve markedly reduces towards the bow and stern are termed respectively the forward shoulder and aft shoulder, which features form major local convexities in the hull having a significant wavemaking effect.

It is known to provide such hulls with a bulb which projects forwardly from the bow below the waterline. The bulb generates a wave system (a "bulb wave") which at the designed service speed interacts at least partially in antiphase with the bow wave so as to reduce the amplitude of the bow wave, achieving a net gain in efficiency. Disadvantageously, the bulb increases the length overall (LOA) of the vessel, which is a key limitation on the availability of docking facilities.

It is known that by positioning the forward shoulder 3 so that the shoulder wave and the bow wave are at least partially in antiphase, the shoulder wave reduces the amplitude of the bow wave and hence the energy dissipated by it. This typically requires the shoulder to be positioned relatively close to the bow. However, all other things being equal, a reduction in the horizontal distance between the shoulder and the bow will result in a blunter hull form which increases its resistance.

Figure 4:
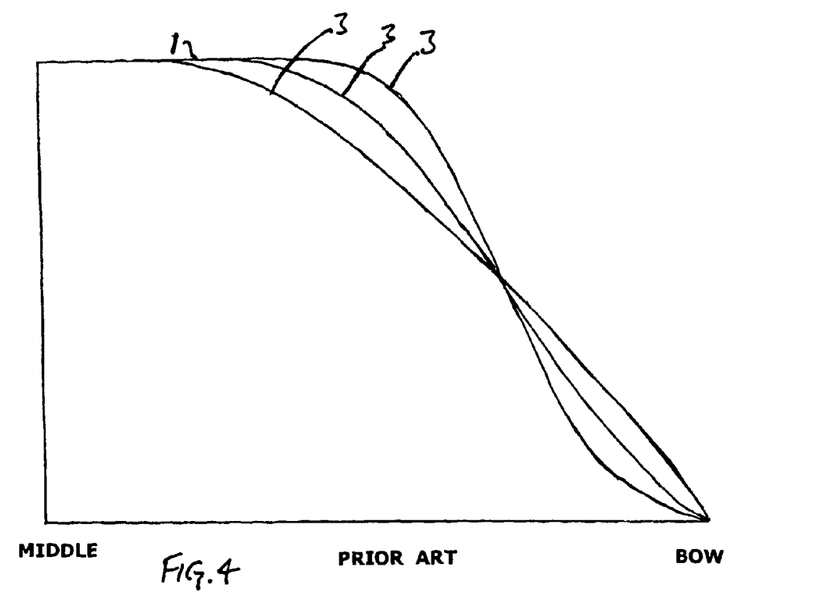
FIG. 4 is a section area curve in which the afterbody is not shown, illustrating variations in the position of the forward shoulder as known in the art.

Referring to FIG. 4, the forebody and midbody portions of three variant prior art hull forms are depicted in which the forward shoulder position 3 is brought progressively further forward towards the bow. All three section area curves have the same displaced volume. It is found that the further forward the shoulder, the higher the drag resistance of the hull, and consequently any efficiency gain from the bow wave/shoulder wave interaction is lost.

Consequently it has hitherto been found impossible to further optimise the bow wave/shoulder wave interaction without incurring a net reduction in energy efficiency.

Various other approaches have been taken to improve efficiency in displacement hulls, the following being examples.

BE 538854 discloses a hull having a protrusion below the waterline at the bow, which is said to increase efficiency.

EP 1852344 discloses a hull form having at least two inflection regions in the curvature of the forebody, defining a bulge which is said to have a positive influence on the wave systems and reduces the wave resistance at a given speed.

US 2005022713 discloses a hull having relatively fine lines with concave surfaces in the forebody, which is said to minimise the bow wave.

EP 1314639 discloses a hull having a sharpened bow and vertical stem without a bulb, which is said to have reduced wavemaking resistance.

GB 303,228 discloses a hull having a fore part with relatively fine lines terminating in a relatively bluff bow, which is said to reduce the bow wave and increase efficiency.

The object of the present invention is to improve the efficiency of a full form hull of a given displacement, preferably without increasing its length overall or reducing its cargo carrying capacity. Most preferably, the cargo carrying capacity should be increased.

In its various aspects the invention provides a ship comprising a full form hull and corresponding methods as defined in the claims.

Compared with a conventional full form hull, in accordance with a first, preferred embodiment the shoulder is moved forwards and upwards towards the waterline, so that the bow is made more blunt (which is to say, the section area of the hull reduces more rapidly from the shoulder towards the bow); and the section area of the hull is arranged to progressively increase aft away from the shoulder, so that this region of the hull is tapered or wedge shaped rather than parallel sided.

Further features and advantages will be apparent from the following illustrative embodiments of the invention which are described, purely by way of example and without limitation to the scope of the claims, and with reference to the accompanying drawings, in which:

Corresponding reference numerals or letters indicate corresponding features in each of the figures.

It will be understood that each section area curve is non-dimensionalised and represents the submerged section area of the hull in the design condition.

Referring to FIG. 1, a prior art cargo vessel comprises a full form ship's hull with a rudder 11 and an engine driven propeller 12 providing respectively steering and propulsion means. The length between perpendiculars (LPP) of the hull extends along its length axis X-X and is defined as the distance between the forward perpendicular (B, FIGS. 1-3) and the aft perpendicular (S, FIGS. 1-3). The forward perpendicular B is a vertical line passing through that point on the stem proximate the bow which intersects the waterline 13 in the design condition; the aft perpendicular S is the rotational axis of the rudder 11 proximate the stem. The service speed of the vessel is the average constantly maintained speed at which it is designed to travel in the design condition, i.e. fully laden and with level trim, i.e. wherein the baseline 14 (defined by a flat surface at the bottom of the hull) is parallel with the waterline. The length overall (LOA) of the vessel is the length between its extremities at bow and stern, and is slightly longer than the LPP. The amidships point M is mid-way along the length axis between B and S.

Referring to FIG. 2, the section area curve shows the section area of the hull, which is the transverse sectional area of the portion of the hull submerged below the waterline in the design condition, with respect to the length axis X-X which ranges in value from −1 at the aft perpendicular S to +1 at the forward perpendicular B. The section area at each point of the hull, having a value between 0 (no section area below the waterline) and 1 (maximum section area below the waterline), is shown on the vertical axis as $A/A_{MAX}$, wherein $A_{MAX}=1$ (maximum section area) and A=section area at each respective point along the length axis, and is illustrated at one exemplary position along the length of the hull as the shaded region 15 in FIG. 1.

The submerged portion of the prior art hull comprises a parallel midbody portion 1, a forebody portion and an afterbody portion. The forebody portion comprises a bow 4 and a forward shoulder 3 aft of the bow. The afterbody portion comprises an aft shoulder 2 and stem portion 5. The hull has its maximum section area at the midbody portion between the forebody and afterbody portions.

Figure 3:
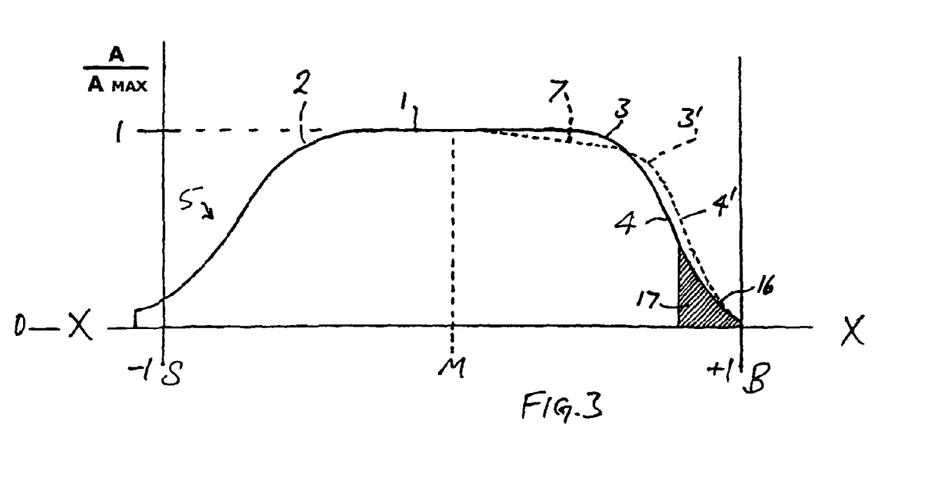
FIG. 3 shows a corresponding non-dimensionalised section area curve in accordance with a first embodiment.

It will be appreciated that the midbody portion 1 may be a parallel midbody of substantial length as shown in FIG. 2, or of reduced length as shown in the modified section area curve of FIG. 3, or alternatively may be a local convexity of minimal length, merely representing a short transition zone where the novel tapered portion of the forebody blends into the afterbody. In each case, the tapered portion may lie entirely ahead of the midships line M or may extend aft of the midships line, the term "forebody portion" being construed to encompass the tapered portion in either case.

Referring to FIG. 3, in accordance with a first, preferred embodiment, in a ship having generally conventional steering and propulsion means, which may be of any appropriate type, the efficiency of the prior art hull form (represented by solid lines) is improved by modifying the position of the forward shoulder, which is moved forwards and upwards from its conventional position 3 towards the waterline to the new position 3' (represented by dashed lines), while a forwardly tapered portion 7 (forming part of the forebody as defined herein) is arranged between the forward shoulder 3' and the midbody portion, replacing at least part of the conventional parallel midbody portion.

Figure 5:
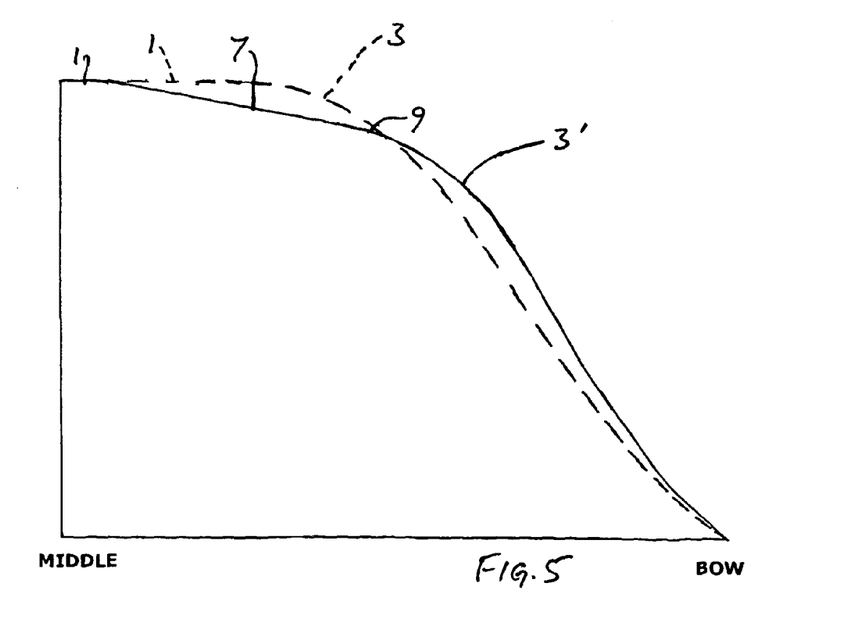
FIG. 5 is a section area curve corresponding to that of FIG. 4 illustrating the position of the forward shoulder in accordance with the first embodiment (solid line) as compared with the prior art (broken line)
Figure 9:
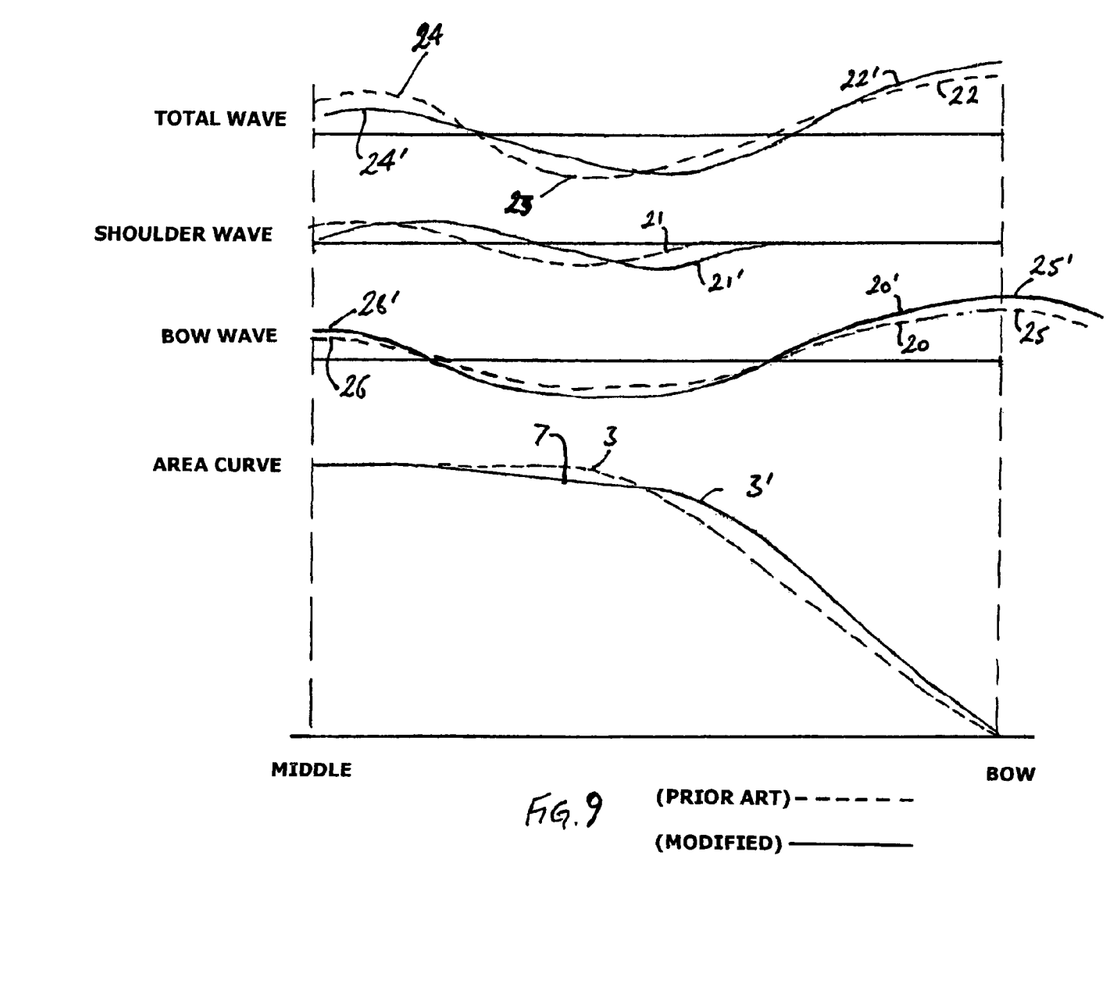
FIG. 9 illustrates the interaction between bow wave and shoulder wave relative to the section area curve at service speed in the design condition in one implementation of the first embodiment.

Referring also to FIGS. 5 and 9, prior art features and wave forms are shown therein in dashed lines while novel features and wave forms are shown in solid lines. The forward shoulder is moved forwards and upwards from 3 (prior art position) to 3' (novel position) while the lines of the bow are moved forwards from the conventional position 4 to the new position 4', so as to obtain an advantageous antiphase interaction between bow and shoulder waves as illustrated in FIG. 9, without incurring a correspondingly increased drag resistance.

The forward shoulder forms a single local convexity which is sufficiently abrupt to provide a substantial wave generating effect at the service speed of the vessel, creating a shoulder wave, and is so positioned that at least a partial antiphase interaction is obtained between the shoulder wave and bow wave sufficient to reduce the amplitude of the bow wave, and preferably sufficient to substantially prevent the bow wave from breaking at its second crest (which is to say, the crest lying aft of its first crest, which typically lies slightly ahead of the bow).

Referring to FIG. 9, the pure shoulder wave 21 (prior art hull), 21' (novel hull) generated by the low pressure region at the shoulder 3 (prior art hull), 3' (novel hull) interacts with the pure bow wave 20 (prior art hull), 20' (novel hull) generated by the high pressure region at the bow to create the visible, resultant bow wave or total wave 22 (prior art hull), 22' (novel hull) as the sum of the two pure waves. In prior art tankers, the shoulder wave tends to augment the pure bow wave so that the resultant bow wave 22 forms a large dip 23 followed by a second crest 24 just behind the shoulder. The second crest 24 is typically steep as shown in the illustration and is prone to breaking, which dissipates a significant amount of energy. The modified area curve of the novel hull places the shoulder wave slightly further forward, modifying the phase relation between the two waves sufficiently to reduce the amplitude of the second crest 24' of the resultant bow wave, making it less steep and substantially reducing its tendency to break.

Thus, rather than a method of reducing overall wave generation, the invention may be thought of as a method of modifying the wave shape so as to avoid wave breaking, achieving an overall improvement in efficiency.

The required change in phase relation may in practice be relatively small. Surprisingly, it is found that although the bow is relatively more blunt that the prior art optimised form (solid line), and the amplitude of the pure bow wave at its first crest 25 (prior art hull), 25' (novel hull) and second crest 26 (prior art hull), 26' (novel hull) may be concomitantly increased as shown, the overall efficiency in terms of propulsion energy is improved by some 6% as compared with the prior art hull as a result of the reduced steepness preventing breaking of the second crest 24' of the resultant bow wave in combination with the advantageous drag resistance characteristic of the novel tapered portion 7. The novel hull form has been found in model tests to give excellent resistance properties.

It will be noted that the total area under the curve (FIG. 3, FIG. 5) remains approximately the same, so that in the example shown the block coefficient is unchanged compared with that of the prior art hull.

Figure 7:
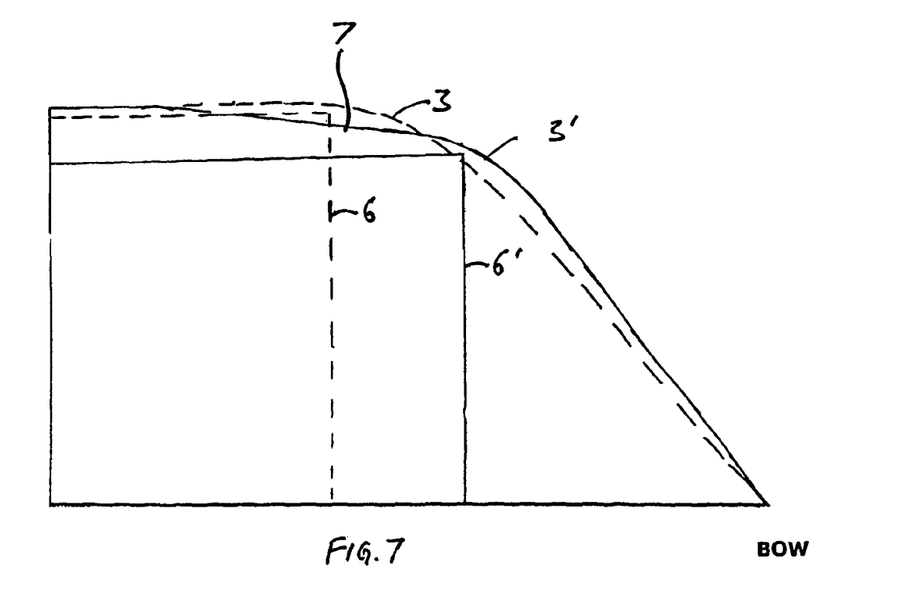
FIG. 7 is a section area curve in accordance with the first embodiment (solid line), as compared with the prior art (broken line), illustrating the position of a cargo tank.

Advantageously, the relatively more forward position of the forward shoulder 3' also enables the cargo carrying capacity to be increased. In a container ship, this may be realised by the increased width at the forward shoulder at the waterline. In a ship carrying liquefied natural gas (LNG), it is found that due to the slightly squarer shape of the forebody, the LNG tank 6' (FIG. 7) may be extended when compared with a corresponding tank 6 in a corresponding prior art hull into the additional space created by the new shoulder position, so as to increase its overall capacity.

The tapered or wedge shaped region 7 of the hull meets the after body or parallel midbody at another local convexity, which may be relatively abrupt, in which case it will form another locus of wave generation, or may be relatively gradual in which case wave generation is minimised at that point.

The tapered portion 7 preferably extends along the length axis X-X for at least about 5% of the LPP, more preferably 10% of the LPP, still more preferably 15% of the LPP, yet more preferably at least 20% or even 25% of the LPP. Where there is no parallel middle body it may extend up to 50% or more of the LPP.

Preferably, the tapered portion 7 is substantially linearly tapered with respect to the length axis, i.e. the surface of the hull is substantially straight rather than curved along the length axis X-X.

Alternatively, the tapered portion 7 may be non-linearly tapered with respect to the length axis, preferably having convex curvature with respect to the length axis to define a subtended angle of not more than 6 degrees, preferably not more than 4 degrees, more preferably not more than 2 degrees, wherein the subtended angle is a geometric angle of the tapered portion represented by a non-dimensionalised area curve plotted on a scale of 0-1 ($A/A_{MAX}$) and $-1$-$+1$ (LPP).

The length of the vessel overall is limited by the availability of suitable docking facilities. It is therefore desirable to maximise the cargo carrying capacity of the vessel without increasing its length overall. In order to ensure the maximum possible cargo carrying capacity, it is desirable as far as possible to maximise the block coefficient of the hull.

The midbody and forebody therefore have overall substantially positive curvature, which is to say, the section area curve of the submerged midbody and forebody portions is generally flat or convex and preferably convex. Preferably, at least 80%, more preferably at least 90%, and most preferably at least 95% (measured by the area under the section area curve) of the section area curve of the submerged midbody and forebody is flat or convexly curved.

A corresponding proportion of the surface area of the submerged midbody and forebody therefore has overall positive three-dimensional curvature, so that the hull surfaces comprising the midbody and forebody are substantially convex or substantially flat, and preferably substantially convex, but not substantially concave. This advantageously minimises the drag resistance of the hull and maximises the block coefficient and hence the cargo carrying capacity of the vessel, for any given length overall, whereas substantial concavity or negative curvature tends to reduce the block coefficient and disadvantageously reduce the cargo carrying capacity.

It should be noted that where the bow waterlines are locally hollow just aft of the stem, reflected in the section area curve by a local concavity (16, FIG. 3) as compared for example with the convexity of the forward shoulder 3, the area (shaded region 17, FIG. 3) under the section area curve reflecting these hollow lines typically represents only a very small percentage of the area under the section area curve of the midbody and forebody. In hulls having a bulb, the forebody is taken not to include the bulb or the region where the bulb fairs into the bow.

Hull forms of the above mentioned type are typically highly developed, and the novel method implemented in accordance with the first embodiment may therefore be considered alternatively as a method of improving the efficiency by reducing wavemaking resistance of a hull form of the above mentioned type, already optimised in accordance with the prior art, by moving the position of the shoulder forwards and upwards to obtain at least a partial antiphase interaction between the shoulder wave and bow wave, sufficient to prevent the bow wave from breaking at its second crest; and introducing the novel forwardly tapered portion into the forebody portion between the new shoulder position and the midbody portion.

The novel method is implemented by known iterative design techniques wherein the final hull form is developed by refining its parameters through computational fluid dynamics to develop a series of intermediate hull forms which are tested in a tank as known in the art.

The wave generating characteristics of the local convexities, which is to say, discontinuities in the geometry of the surface of the hull as represented on its section area curve, are dependent inter alia on the abruptness of the convexity, which is a function of its subtended angle and overall radius of curvature.

Figure 8:
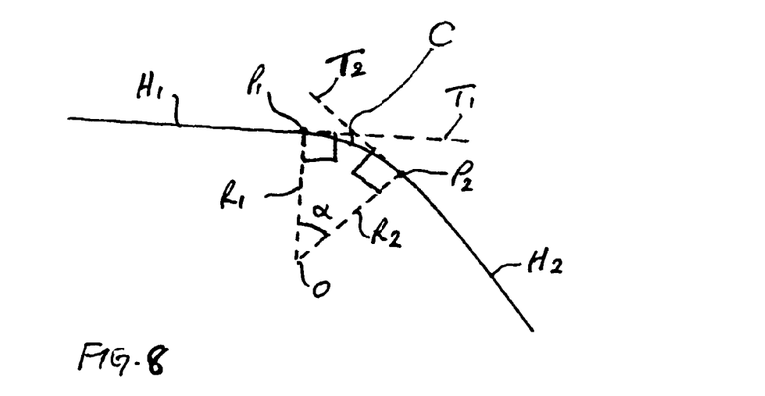
FIG. 8 illustrates the parameters used hereinafter in defining the abruptness of a local convexity as represented on the section area curve of the hull.

Referring to FIG. 8, the subtended angle a of the or each local convexity C is defined with reference to the section area curve as the angle between first R1 and second R2 radii of curvature of the convexity, the radii being imaginary lines extending from their point O of mutual intersection to meet respective first T1 and second T2 imaginary tangent lines, each tangent line being orthogonal to the respective radius of curvature R1, R2 and tangent to a respective one of the two adjacent portions H1, H2 of the section area curve at the point P1, P2 at which that portion blends into the local convexity C.

The overall radius of curvature of each local convexity C, which may comprise compound curves, is defined as the average length of its first and second radii of curvature R1, R2.

It will be understood that the local convexity is defined as a convex portion of the non-dimensionalised section area curve with respect to the length axis. The subtended angle of the tapered portion, where the taper is convex rather than linear with respect to the length axis, is calculated in the same way.

Figure 6:
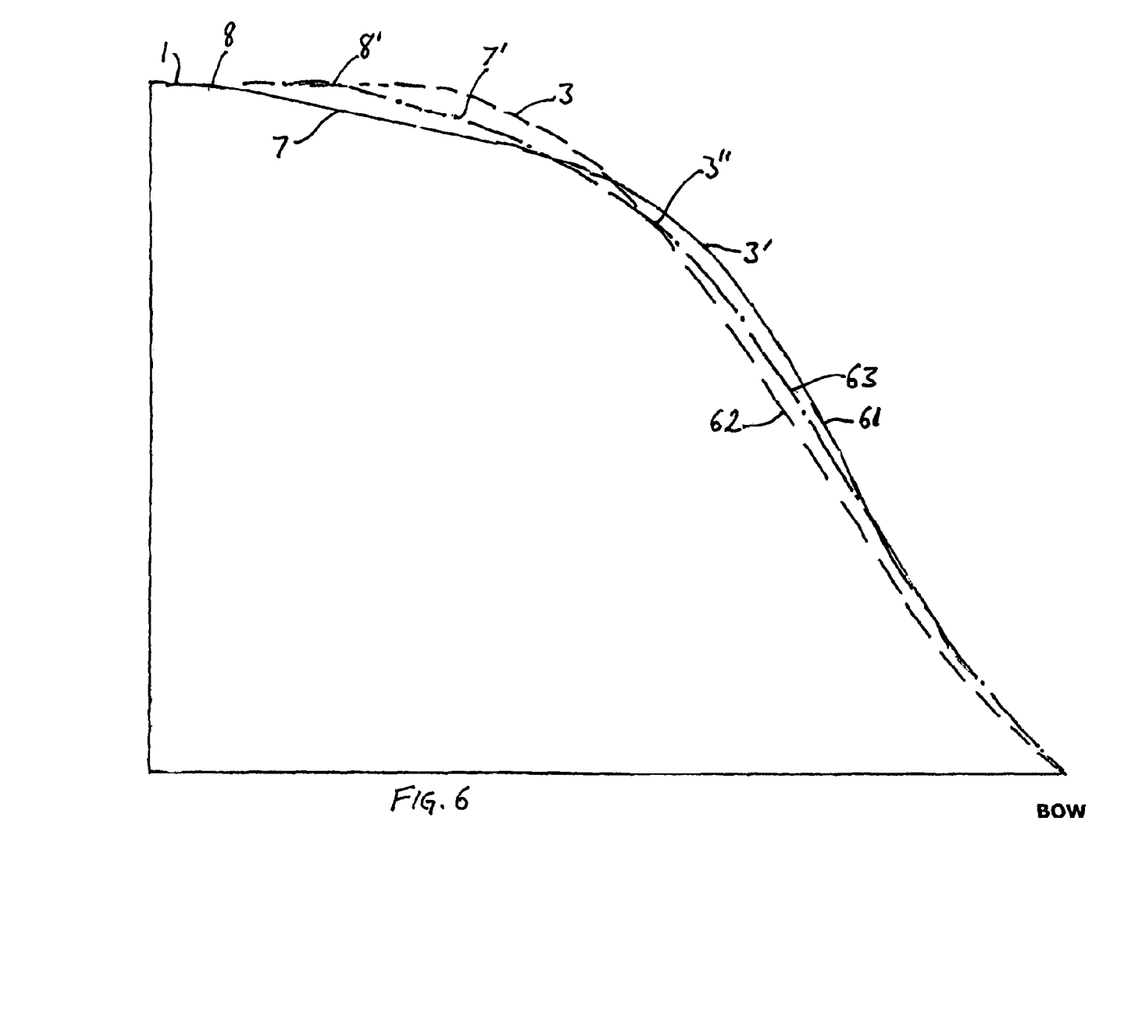
FIG. 6 is a section area curve of the forebody illustrating the position of the shoulder in accordance with the prior art (broken line), the first embodiment (solid line), and a second embodiment (chain line)

Referring to FIG. 6, in the first, preferred embodiment shown by the solid line curve 61, the shoulder 3' is made relatively abrupt while the tapered portion 7 aft of the shoulder blends into the midships portion 1 at a relatively soft local convexity 8, i.e. a local convexity having minimal abruptness, which forms a gentle fairing where the forward body portion is blended into the after body or parallel middle body portion so that wavemaking at that point is insignificant in comparison with that generated by the forward shoulder. The forward shoulder 3' is preferably made relatively hard, i.e. relatively abrupt, so that it acts as a significant generator of waves whereas the tapered portion 7 and convexity 8 do not.

The conventional hull form with shoulder 3 is shown for reference as the dashed line curve 62.

Preferably the section area at a point 9 (FIG. 5) on the length axis X-X where the tapered portion 7 meets the forward shoulder 3' is at least 75%, more preferably 80%, yet more preferably 85%, or advantageously as much as 90% or even 95% or more of the maximum section area of the hull. This maxises the block coefficient and minimises wavemaking in the tapered portion while advantageously enhancing wave generation at the shoulder and hence the desirable antiphase interaction between the bow and shoulder waves.

The forward shoulder preferably has a convex curvature with respect to the length axis represented on the section area curve by a subtended angle of at least 5 degrees and more preferably 25 degrees, although greater angles of at least 50 or even 70 degrees will advantageously increase wave generation at this point. Its convex curvature with respect to the length axis is preferably represented on the section area curve by an overall radius of curvature of not more than 3.0 LPP, more preferably 1.5 LPP, while more abrupt curvature and more pronounced wave generation is obtained by an overall radius of curvature of not more than 1.0 LPP, more preferably 0.5 LPP, or even 0.15 LPP, it being understood that abruptness is a function of subtended angle and overall radius of curvature. In a typical embodiment, the subtended angle of the forward shoulder is approximately 50 degrees and its overall radius of curvature is approximately 0.5 LPP.

Figure 10:
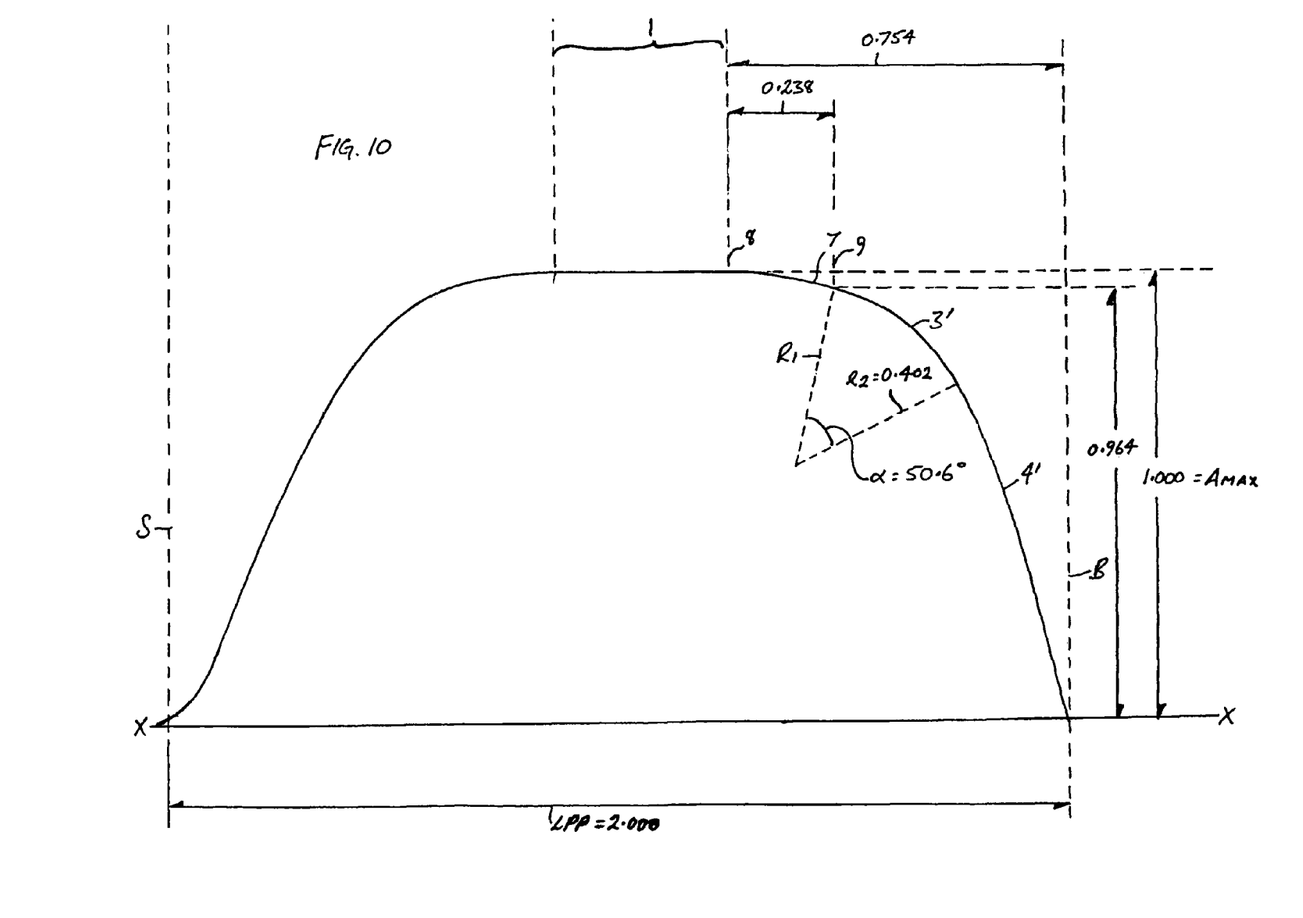
FIG. 10 is a section area curve of a full form hull in accordance with a further embodiment.

Referring to FIG. 10, in a further preferred embodiment, a cargo vessel comprises a hull comprising a rudder and propeller (not shown) similar to those of FIG. 1, with a forward shoulder 3' which meets a tapered portion 7 at a point 9, the tapered portion gently fairing into the parallel midbody at a point 8. The length between parallels LPP is assigned an arbitrary value of 2.000 units. The forward shoulder has a subtended angle α of 50.6° with a radius of curvature R2 of 0.402; which is to say, the radius of curvature R2=0.201 LPP. The tapered portion 7 extends for 0.238 units of length, i.e. for 0.119 LPP, while the length of the forebody forward of the point 8 is 0.754 units of length, or 0.377 LPP. The section area A at the point 9 is 0.964 $A_{MAX}$, wherein $A_{MAX}$≈1.000. The section area curve of the forebody and midbody has entirely positive curvature, i.e. it is entirely flat or convex. The substantial subtended angle and relatively small radius of curvature of the forward shoulder has a pronounced wavemaking effect while the relatively short tapered portion fairs into the hull at the point 8 at a gentle angle of about 4° with respect to the parallel midbody. The resulting antiphase relation of the bow wave and shoulder wave provides the novel hull with a substantial efficiency gain over the prior art hull form which is surprising in view of its relatively blunt forebody and high block coefficient.

Referring again to FIG. 6, in an alternative embodiment shown by the chain line curve 63, the shoulder 3" is again moved forwards and upwards (i.e. towards the waterline) relative to the conventional hull but is made relatively soft, while the local convexity 8' is made relatively abrupt. This shifts the focus of wavemaking aft to the convexity 8'. The length of the taper portion 7' is relatively shorter than in the first embodiment, while its rate of taper is relatively faster, these parameters being selected to position the aft local convexity 8' with respect to the bow and other wave generating hull features so as to optimise wave interaction, again achieving an energy saving.

Advantageously, the phase difference between the shoulder wave and bow wave at the service speed may be at least 40 degrees, and may be as much as 60, 80, 100, 120, or even 140 degrees or more. In practice, the phase difference is determined by calculation and testing in accordance with known design techniques so as to achieve an optimal balance between the key parameters of the hull, at which newly optimised design point the additional efficiency realised by the novel combination of tapered portion and shoulder position is achieved. In practice, even relatively small phase differences may achieve significant efficiency savings when the modified shoulder position is provided in combination with a novel tapered portion in accordance with the invention.

In other embodiments, the forward shoulder may comprise two or more local convexities. For example, two or three local convexities may be located so as to create an advantageous interaction of wave systems. In yet further embodiments, as many as four or five or even more local convexities may be provided, each of which however will have a concomitantly reduced effect.

Where the forebody has overall positive curvature, the abruptness of each local convexity is obviously limited by the number of local convexities and the overall degree of curvature of the forebody; so the more local convexities are provided, the less abrupt each one will be. The greater the subtended angle and the smaller its overall radius of curvature, the more abrupt will be the local convexity. The abruptness of each local convexity can be increased by flattening the hull on either side, which however reduces the block coefficient. By providing concave hull surfaces, the local convexities can be further enhanced; however, substantial convexity is required in order to obtain significant abruptness, and the block coefficient is concomitantly adversely reduced.

Although embodiments of the invention have been described with reference to the fore part of the hull, the motion of water over the aft portion of the hull gives rise to similar patterns of wave formation at the stem, dissipating propulsive energy and giving rise to a drag or braking force. It has been found that the principles of the invention may advantageously be applied to the after body portion of the hull, alternatively or additionally to the fore body portion, to reduce wave formation and increase efficiency, with the parameters described in relation to the forebody being applied mutatis mutandis to the afterbody.

In each embodiment, the hull can also advantageously be made relatively long, narrow and deep when compared with the prior art hull, which is found to result in still greater efficiency. In such more slender forms, the shoulder would normally be placed further aft, whereas the novel tapered portion allows the shoulder to be placed relatively further forward as if the vessel were fuller, so that its cargo carrying capacity corresponds to a vessel having fuller lines.

Moreover, it is found that greater efficiency is gained from a bulbless hull than from a bulbous hull, where the stem of the bulbless hull is moved forward so that the forebody is elongated to occupy the space taken by the prior art bulb, keeping the overall length of the vessel the same. The invention may nevertheless be applied to hulls with bulbous bows as well as hulls without a bulb. The novel hull form may be applied to cargo ships of the size of a coaster, having a displacement of a few hundred tonnes, through cargo vessels of 15,000 tonnes or so, up to the largest ships such as very large crude carriers, with displacements of 300,000 tonnes or more.

Instead of a rudder and propeller, any other steering and propulsion means as known in the art may be provided, including for example combined steering and propulsion means such as azimuthing propellers.

Many other adaptations will be evident from the foregoing illustrative description, and it will be understood that the invention is limited only by the scope of the claims.

The invention claimed is:

1. A ship comprising a full form hull, steering means, and propulsion means, and having a service speed, a length between perpendiculars (LPP), a length axis, and a section area defined as the transverse sectional area of the hull below the waterline in a design condition, the submerged portion of the hull in the design condition comprising a forebody portion, an afterbody portion, and a midbody portion of maximum section area arranged between the forebody portion and the afterbody portion, the forebody portion comprising a bow and a forward shoulder aft of the bow, the forward shoulder positioned to give a phase difference of at least 40 degrees between a shoulder wave generated by the shoulder and a bow wave generated by the bow at the service speed, the midbody and forebody portions having substantially positive curvature as represented on a section area curve of the hull;

characterised in that the forebody portion includes a forwardly tapered portion arranged between the forward shoulder and the midbody portion.

2. A full form ship's hull according to claim 1, wherein the tapered portion is substantially linearly tapered with respect to the length axis as represented on the section area curve.

3. A full form ship's hull according to claim 1, wherein the tapered portion is non-linearly tapered with respect to the length axis as represented on the section area curve.

4. A full form ship's hull according to claim 3, wherein the tapered portion has convex curvature along the length axis defining a subtended angle of not more than 6 degrees on the section area curve.

5. A full form ship's hull according to claim 1, wherein the tapered portion extends along the length axis for at least 5% of the LPP.

6. A full form ship's hull according to claim 1, wherein the section area at a point on the length axis where the tapered portion meets the forward shoulder is at least 75% of the maximum section area of the hull.

7. A full form ship's hull according to claim 1, wherein at least 80% of the section area curve representing the midbody and forebody portions, as measured by the area under the section area curve, is flat or convexly curved.

8. A full form ship's hull according to claim 1, wherein the forward shoulder has convex curvature with respect to the length axis defining a subtended angle of at least 5 degrees on the section area curve.

9. A full form ship's hull according to claim 8, wherein the forward shoulder has convex curvature with respect to the length axis defining an overall radius of curvature of not more than 3.0 LPP on the section area curve.

10. A method for reducing wavemaking resistance in a full form ship's hull in a vessel having steering means, propulsion means, a service speed, a length between perpendiculars (LPP), a length axis, and a section area defined as the transverse sectional area of the hull below the waterline in a design condition, the submerged portion of the hull in the design condition comprising a forebody portion, an afterbody portion, and a midbody portion of maximum section area arranged between the forebody portion and the afterbody portion, the forebody portion comprising a bow and a forward shoulder aft of the bow, the midbody and forebody portions having substantially positive curvature as represented on a section area curve of the hull;

characterised by positioning the forward shoulder to obtain at least a partial antiphase interaction between a shoulder wave generated by the shoulder and a bow wave generated by the bow at the service speed, the interaction reducing the amplitude of the bow wave sufficiently to prevent the bow wave from breaking at a second crest thereof;

and by arranging a forwardly tapered portion between the forward shoulder and the midbody portion, the forwardly tapered portion forming part of the forebody portion.

11. A method according to claim 10, wherein the tapered portion is substantially linearly tapered with respect to the length axis as represented on the section area curve.

12. A method according to claim 10, wherein the tapered portion is non-linearly tapered with respect to the length axis as represented on the section area curve.

13. A method according to claim 12, wherein the tapered portion has convex curvature along the length axis defining a subtended angle of not more than 6 degrees on the section area curve.

14. A method according to claim 10, wherein the tapered portion extends along the length axis for at least 5% of the LPP.

15. A method according to claim 10, wherein the section area at a point on the length axis where the tapered portion meets the forward shoulder is at least 75% of the maximum section area of the hull.

16. A method according to claim 10, wherein the forward shoulder is positioned to give a phase difference of at least 40 degrees between a shoulder wave generated by the shoulder and a bow wave generated by the bow at the service speed.

17. A method according to claim 10, wherein at least 80% of the section area curve representing the midbody and forebody portions, as measured by the area under the section area curve, is flat or convexly curved.

18. A method according to claim 10, wherein the forward shoulder has convex curvature with respect to the length axis defining a subtended angle of at least 5 degrees on the section area curve.

19. A method according to claim 18, wherein the forward shoulder has convex curvature with respect to the length axis defining an overall radius of curvature of not more than 3.0 LPP on the section area curve.

20. A method for reducing wavemaking resistance in an optimised full form ship's hull in a vessel having steering means, propulsion means, a service speed, a length between perpendiculars (LPP), a length axis, and a section area defined as the transverse sectional area of the hull below the waterline in a design condition, the submerged portion of the hull in the design condition comprising a forebody portion, an afterbody portion, and a midbody portion of maximum section area arranged between the forebody portion and the afterbody portion, the forebody portion comprising a bow and a forward shoulder aft of the bow, the midbody and forebody portions having substantially positive curvature as represented on a section area curve of the hull;

characterised by modifying the forward shoulder by moving it forwards and upwards to a position in which at least a partial antiphase interaction is obtained between a shoulder wave generated by the shoulder and a bow wave generated by the bow at the service speed, the interaction reducing the amplitude of the bow wave sufficiently to prevent the bow wave from breaking at a second crest thereof;

and by arranging a forwardly tapered portion between the forward shoulder and the midbody portion, the forwardly tapered portion forming part of the forebody portion.

\* \* \* \* \*

UNITED STATES PATENT AND TRADEMARK OFFICE
CERTIFICATE OF CORRECTION

| | | |
|---|---|---|
| PATENT NO. | : 9,003,989 B2 | Page 1 of 1 |
| APPLICATION NO. | : 13/816022 | |
| DATED | : April 14, 2015 | |
| INVENTOR(S) | : Thomas Dinham-Peren and Hans-Richard Hansen | |

It is certified that error appears in the above-identified patent and that said Letters Patent is hereby corrected as shown below:

Title Page (73) Assignees should read: BMT Defence Services Limited, Bath (GB)
Teekay Shipping Limited, Hamilton (BM)

Signed and Sealed this
Twenty-seventh Day of October, 2015

Michelle K. Lee
*Director of the United States Patent and Trademark Office*